United States Patent [19]

Koske

[11] Patent Number: 4,689,060

[45] Date of Patent: Aug. 25, 1987

[54] CAB ENGINE AIR INTAKE SYSTEM AND METHOD

[75] Inventor: Charles E. Koske, Fremont, Calif.

[73] Assignee: Paccar, Inc., Bellevue, Wash.

[21] Appl. No.: 865,823

[22] Filed: May 22, 1986

[51] Int. Cl.[4] .............................................. B01D 50/00

[52] U.S. Cl. ................................ 55/385 B; 180/68.1; 180/68.3

[58] Field of Search ......................... 55/385 B, 385 R; 180/68.3, 68.1; 123/198 E

[56] References Cited

U.S. PATENT DOCUMENTS

| | | | |
|---|---|---|---|
| 1,863,015 | 6/1932 | Kamrath | 180/68.3 |
| 1,876,679 | 9/1932 | Holmes | 55/385 B |
| 1,931,039 | 10/1933 | Steenson | 180/68.3 |
| 4,013,137 | 3/1977 | Peterson | 55/385 B |
| 4,157,902 | 6/1979 | Tokar | 55/385 B |
| 4,208,197 | 6/1980 | Yakimowich et al. | 55/385 B |
| 4,235,298 | 11/1980 | Sackett et al. | 180/68.3 |

FOREIGN PATENT DOCUMENTS

| | | | |
|---|---|---|---|
| 1023124 | 12/1952 | France | 180/68.3 |
| 45769 | 3/1985 | Japan | 123/198 E |
| 282919 | 8/1952 | Switzerland | 180/68.3 |

*Primary Examiner*—Bernard Nozick

*Attorney, Agent, or Firm*—Flehr, Hohbach, Test, Albritton & Herbert

[57] ABSTRACT

An air intake system for providing air to the engine of a conventional truck is disclosed herein and includes an intake vent located on the side of the truck's cab just in front of its door. A cab elbow fabricated from rubber transports air from the intake vent through the interior of the cab and to an opening in the firewall where it connects with an air duct within the truck's hood compartment. The air is then transported via the air duct to the engine. The cab elbow is designed to minimize thermal and acoustical interference with the cab's interior. The present system may be used in conjunction with either cowl mounted air cleaners or an underhood air cleaner without modifying other components of the truck.

8 Claims, 8 Drawing Figures

CAB ENGINE AIR INTAKE SYSTEM AND METHOD

The present invention relates generally to an air intake system for an internal combustion engine of a conventional truck. More specifically, it relates to an air intake system which supplies air drawn from the cab's side and which pipes the air through the passenger compartment before delivery to the engine.

To protect an engine from damage caused by the injection of road dust and moisture, it is desirable to take the air from a portion of the truck's periphery, that is air relatively undisturbed by the dust and moisture kicked up by the truck itself. Typically one or more air cleaners will be provided to even further cleanse the air before it enters the engine.

Conventional intake systems for heavy trucks have traditionally fallen into two categories. The first is an underhood air cleaner with air supplied from a frontal air intake or hood duct. The other typical design is an outside cowl mounted air cleaner that is ducted through hood panels to the engine. Both designs have serious drawbacks and, in combination, create an undesirable proliferation of parts. The cowl mounted air cleaners, for example, require an air cleaner panel for ducting air to the engine, an adapter for connecting the two, and fasteners. Additionally, a cutout in the hood is frequently required to clear the panel. The cutout not only weakens the hood but since all models do not include cowl mounted air cleaners, it requires that hoods be fabricated both with and without the cutouts.

Under hood air cleaners with frontal air intakes have a serious problem with dirt and moisture contamination. The front of the hood is low enough so that it is subjected to the dust and spray kicked up by the truck. Similarly, systems that intake air through the side of the hood have the serious drawback of requiring an expensive elastic joint to seal with the hood on a slip plane.

One prior art design that has attempted to address some of these problems is shown in FIGS. 2A and 2B. The ducting from a cowl mounted air cleaner was passed under the toeboard of the cab and then directed back towards the engine. One of the major problems with this design is that is takes valuable leg space from the interior of the cab.

Outside the gambit of large trucks, others have attempted to provide engine air from outside the hood compartment. For example, in U.S. Pat. No. 1,931,039 STEENSON teaches a method of providing cool air from the side of a vehicle to its engine. STEENSON provides an air duct having a warm air inlet within the hood compartment that extends rearwardly through an opening in the vehicle's dash and into the space surrounded by a cowl. The rear end of the air duct has a cool air inlet located in a ventilating opening formed in the side of the cowl. By operating a lever within the passenger compartment of the vehicle, the driver can selectively choose the introduction of either warm or cold air to the engine. However, the design presented has several serious problems relative to it's thermal and acoustical attributes. Whenever "cool" air from outside the engine compartment is introduced to the engine, it is also introduce to the interior of the passenger compartment, hardly a desirable attribute for a truck that must be designed to operate in sub-zero temperatures. Additionally, there is no acoustical insulation between the air intake and the passenger compartment.

It is therefore an object of the present invention to provide an approach to supplying air to the engines of conventional trucks, which approach does not have the disadvantages discussed above.

A more specific object of the present invention is to provide a method of supplying relatively dust and moisture free air to the engine utilizing a minimum amount of space.

A still further object of the present invention is to provide a standard air intake system that can accommodate both cowl mounted and underhood air cleaners without requiring modification of any parts outside the intake system.

To achieve these and other objectives, the present invention provides an air intake system for use in a conventional truck that includes a means of gathering air from the side of the cab and channeling that air through an aperture located in the cab's side just in front of one of the door. The air thus gathered is passed through the interior of the cab via a specially constructed cab elbow to an opening in the firewall that separates the cab from the hood compartment. From the firewall opening, an air channeling means located within the hood compartment transports the air to the engine. All of the air that enters the engine in this manner is filtered. It is contemplated that either cowl mounted or underhood air cleaners could be used.

The cab elbow is fabricated from a material that has excellent thermal and acoustical damping characteristics. Preferably this material is a soft, smooth rubber. Additionally the cab elbow has seals on both ends to accommodate the connection with the air gathering means and the air channeling means, respectively. Incorporating seals on both ends of the cab elbow isolates the cab's interior sufficiently from the air intake system so that the cab's environment will not be adversely affected by the introduction of engine air therethrough.

Since truck engines generally require a tremendous amount of air, the present invention also contemplates that it might be desirable to enhance the introduction of air by drawing air from both sides of the truck. To accommodate this, the described structure would merely be duplicated and the air channeling means would additionally combine the airflow from the two intake vents.

The advantages of the air intake system just described are numerous. First, since air is drawn from the truck's side, it will typically be cleaner than air drawn from the hood region since it is not subject to the same level of dirt and moisture kicked up by the moving truck. Second, regardless of the type of air filter used, there is no difference in the path that the intake air proceeds along, thereby eliminating the need to specially fabricate parts based on the air filtration system incorporated.

Still other objects and features of the present invention will be apparent from the following detailed description in conjunction with the accompanying drawings, wherein.

Figure 1:
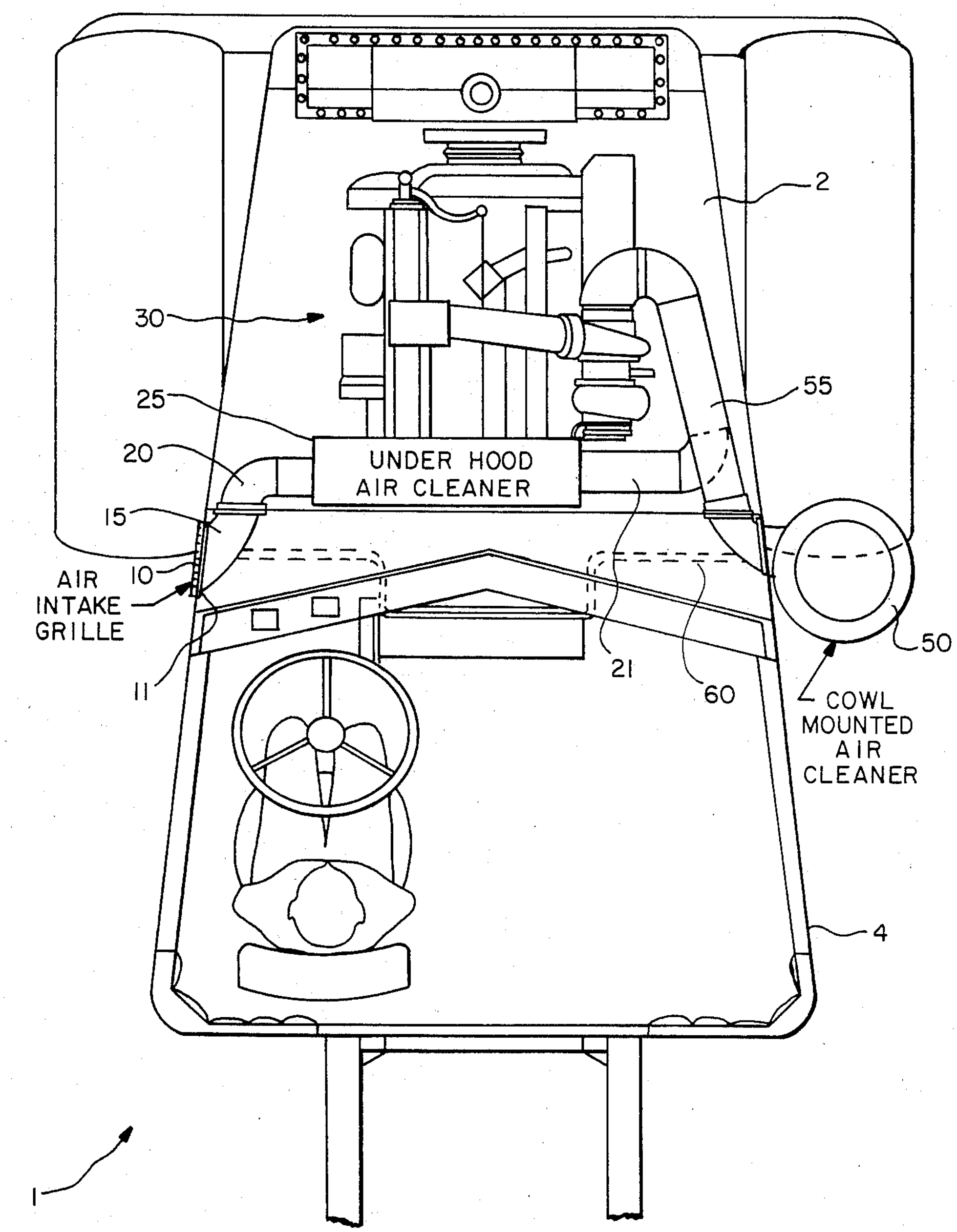
FIG. 1 is a top elevational view of the present invention incorporating both an underhood air cleaner and a cowl mounted air cleaner.
Figure 2A:
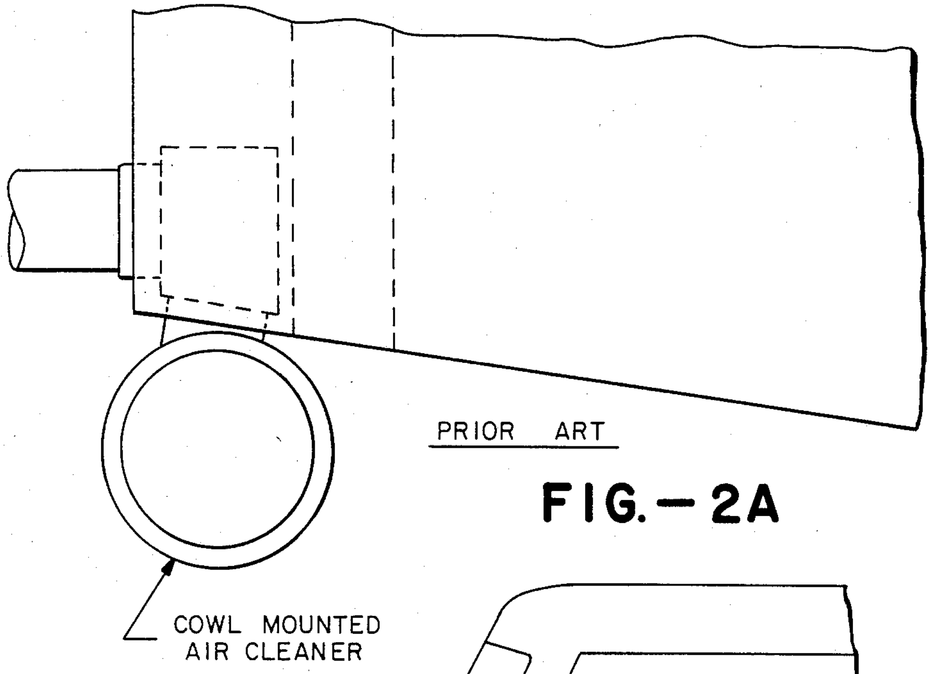
PRIOR ART FIG.—2A
FIG. 2A is a top plan view of a prior art cowl mounted intake system.
Figure 2B:
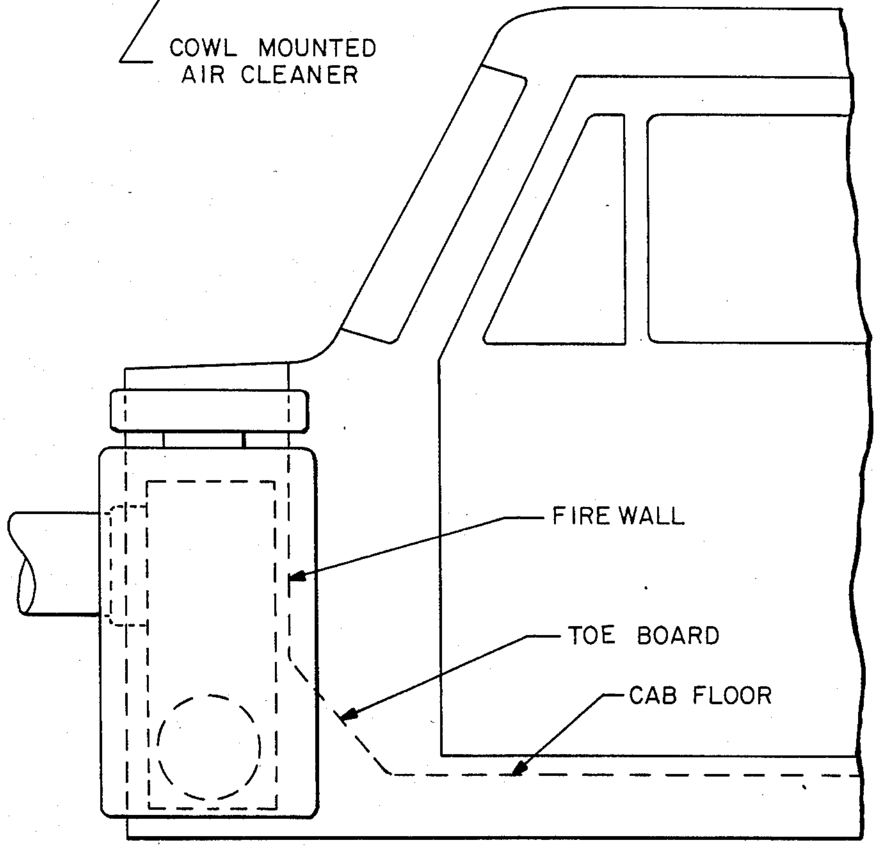
FIG.—2B PRIOR ART
FIG. 2B is a side elevational view of the prior art cowl mounted intake system shown in FIG. 2A.
Figure 3A:
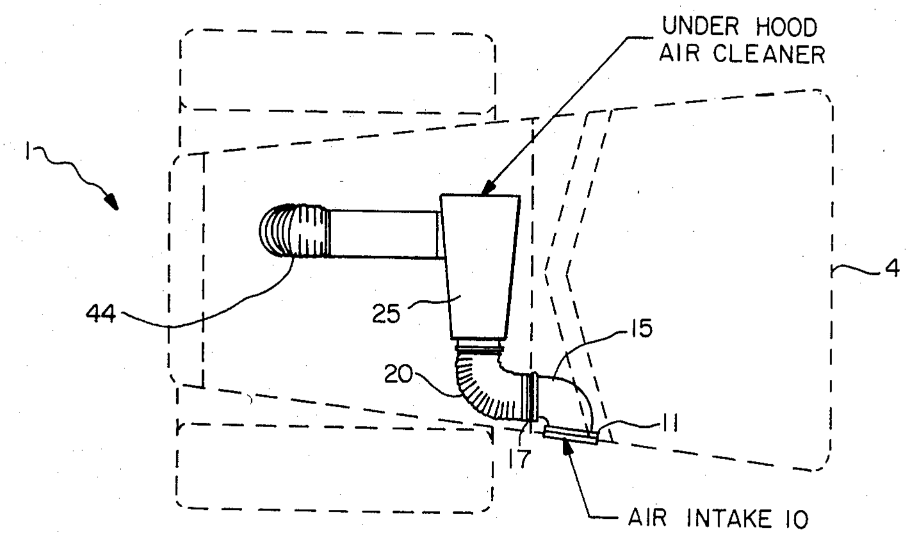
FIG. 3A is a top elevational view of the present invention used in conjunction with an underhood air cleaner.
Figure 3B:
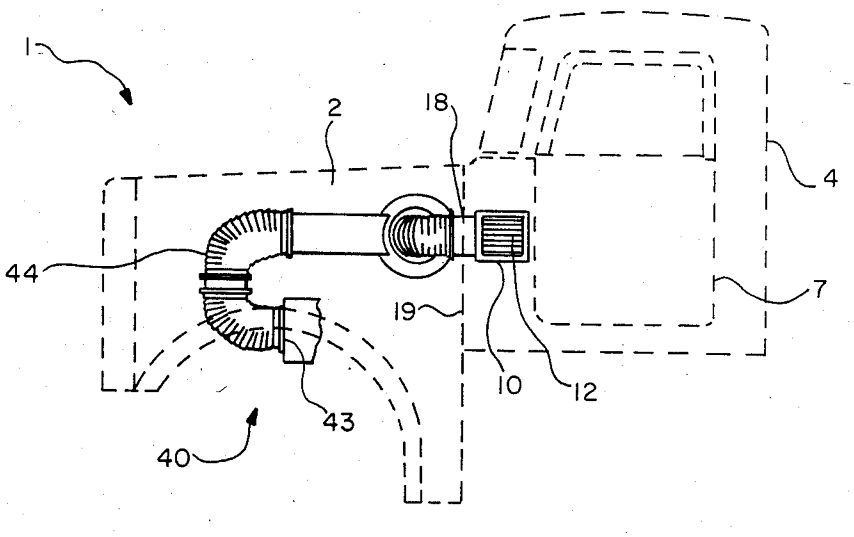
FIG. 3B is a side elevational view of the intake system shown in FIG. 3A.

Turning now to the drawings, wherein like components are designated by like reference numerals throughout the various Figures, attention is first directed to FIGS. 3A and 3B which illustrate the present invention in conjunction with an underhood air cleaner. A conventional truck is shown at 1 including a hood compartment 2 and a cab 4. Air intake 10 cooperates with an aperture 11 cut into the side of cab 4 just in front of door 7. A cab elbow 15 engages air intake 10 through an exterior cab wall 11 and channels the incoming air through the cab 4 to an opening 18 in firewall 19. The air passes through opening 18 and a cooperating air duct 20 located under the hood and into underhood air cleaner 25. From air cleaner 25, the air passes in a conventional manner via air duct 21 to engine 30, as best seen in FIG. 1. Air intake 10 preferably incorporates grill 12 to prevent debris from entering the intake system.

Referring specifically to FIG. 1, cab elbow 15 is run underneath dash 60 in cab 4 far enough above the foot pedals 62 to avoid interfering with passenger legroom. Cab elbow 15 has seals 16 and 17 (see FIGS. 3A and 5) on each end and is fabricated from smooth, soft rubber. The rubber provides both thermal and acoustic insulation between the cab interior and the air intake system. This is particularly important since, unlike prior art designs, the present invention contemplates passing intake air through the cab interior. Thus, in order to accommodate passenger comfort it is extremely important to effectively damp noise as well as to thermally insulate the air intake system. Seal 16 on cab elbow 15 snugly engages the cab side skin of exterior wall 11 defining air intake 10 so as to prevent leakage of outside air into cab 4. Similarly, seal 17 snugly engages in firewall 19 (see FIG. 3A) to prevent leakage of engine compartment air into the cab.

With the present invention it may be desirable to include an additional means of getting air to the engine. To accommodate this, an underhood air intake system 40 may optionally be located within the hood compartment. Duct 44 channels the air to the intake 43 of the engine, as seen in FIGS. 3A, 3B and 4B.

Figure 4A:
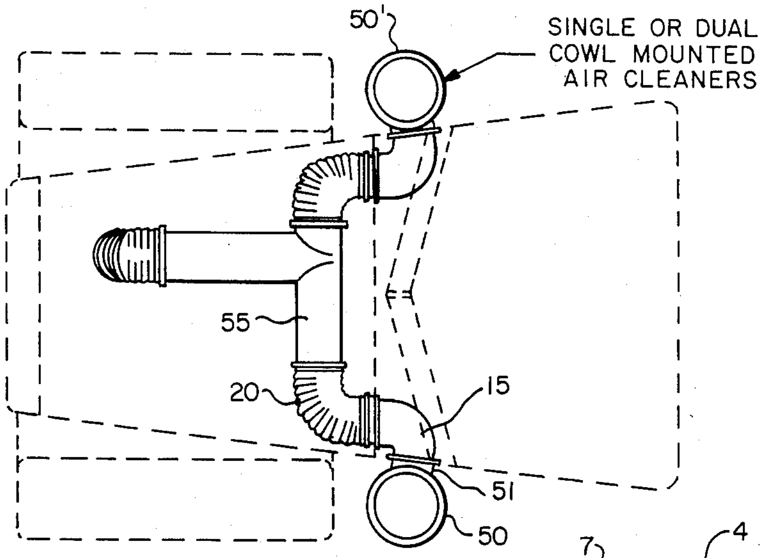
FIG. 4A is a top elevational view of the present invention used in conjunction with dual cowl mounted air cleaners.
Figure 4B:
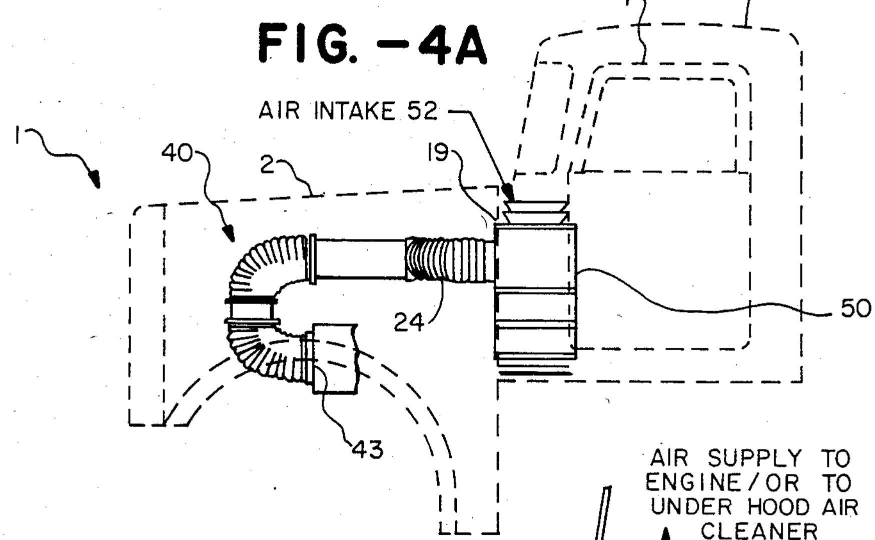
FIG. 4B is a side elevational view of the intake system shown in FIG. 4A.

FIGS. 4A and 4B show elevational views of the present invention used in conjunction with dual cowl mounted air cleaners. Although the system shown there will be described as if there were only a single cowl mounted air cleaner 27, installation of a second cowl mounted air cleaner 28 could easily be accomplished merely be duplicating the structure described and placing it on the opposite side of the vehicle. Air cleaner 50 is attached to the cowl just in front of door 7. Air intake 52 (FIG. 4B) draws air into air cleaner 50 in a conventional manner. Cleaner tube 51 extends from air cleaner 50 through an opening cut in the cab 4. Seal 16 on cab elbow 15 snugly engages cleaner tube 51 in the same manner as it engaged air intake 10 in the previous embodiment. Cab elbow 15 is run underneath dash 60 in cab 4 far enough above the foot pedals to avoid interfering with passenger legroom. In place of the underhood air cleaner describe in the previous embodiment, plastic tubing 55 passes air between duct 20 and the engine. In all other respects, the cowl mounted embodiment of the present invention is identical to the previously described system involving an underhood air cleaner. To accommodate dual cowl mounted air cleaners, plastic tubing 55 is essentially T shaped, thereby allowing air from both of the air cleaners, as is apparent from FIG. 4A.

In accordance with the spirit of the present invention, and as demonstrated in FIG. 1, any combination of cowl mounted and underhood air cleaners could be used. When more than one air cleaner is used, then it is necessary to configure plastic tubing 55 within hood compartment 1 to accommodated combining the airflow from each of the desired air cleaners.

Figure 5:
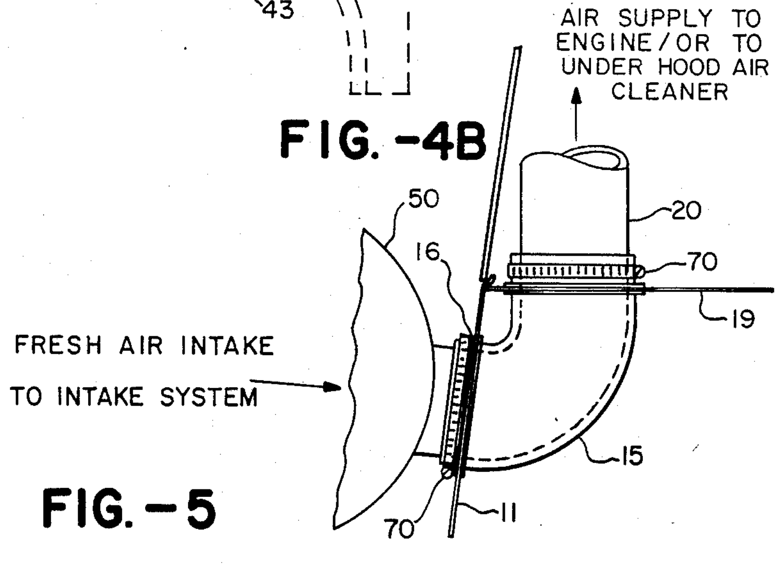
FIG. 5 is an elevational view of a cab elbow shown in its operating position and designed in accordance with the present invention.

Reference is now made to FIG. 5 which presents an elevational view of cab elbow 15. The elbow is fabricated from a soft smooth rubber to provide maximum sound damping and thermal insulation, as stated previously. In an actual embodiment, the elbow is appoximately 0.500 inch thick and is integrally formed from rubber having a durometer of hardness of 60–70 durometer shore A scale. Seal 16 located on one end of elbow 15 is designed to engage the cab skin of exterior wall 11. Seal 17 is designed to engage firewall 19 in a similar manner. Hose clamps 70 secure the elbow in place, as shown in FIG. 5, as shown in FIG. 3A.

It will be apparent to those skilled in the art that various other modifications and variations could be made in the structure of the invention without departing from its scope and content.

What is claimed is:

1. In a truck including an engine, a hood compartment, a cab and a firewall separating said cab from said hood compartment, an engine air intake apparatus comprising:

(a) an aperture in the side of said cab;

(b) means for gathering air from the side of said cab and channeling the air through said aperture;

(c) an opening in said firewall;

(d) a cab elbow positioned within said cab for receiving air passing through said aperture and transporting it to said opening, said cab elbow having first and second ends and having first and second seals on said ends, respectively, said cab elbow being fabricated from a material that has good thermal and acoustical damping characteristics, said first end seal serving to prevent air from entering said cab from outside the latter;

(e) means for channeling the air from said opening to said engine, said channeling means being substantially located within said hood compartment; and (f) at least one air cleaner mounted to and forming part of said truck such that the air must pass therethrough before entering said engine;

(g) said second end seal serving to prevent air within said hood compartment from escaping into said cab through said opening and outside said channeling means.

2. In a truck an engine air intake apparatus as described in claim 1 wherein said cab elbow is fabricated from rubber.

3. In a truck an engine air intake apparatus as described in claim 2 wherein said truck further includes a cowl mounted to and on the outside of said truck and wherein said air cleaner is mounted to said cowl, said air cleaner filtering the air before the air enters said cab elbow.

4. In a truck an engine air intake apparatus as recited in claim 2 wherein said air cleaner is located within said hood compartment, said air cleaner receiving the air for filtering from said air channeling means.

5. An engine air intake apparatus forming part of a heavy truck that includes a hood compartment, an engine disposed within said hood compartment, a cab having a first and a second door located on opposite sides of said cab, and a firewall separating said cab from said hood compartment, the engine air intake apparatus comprising:

(a) a first and a second aperture located on opposite sides of said cab at positions respectively in front of said first door and said second door;

(b) means for gathering air from both sides of said cab and channeling said air through said apertures;

(c) a pair of openings in said firewall, each said opening being associated with a single one of said apertures;

(d) a pair of cab elbows, each being disposed between a single one of said apertures and its associated opening, each said elbow being for receiving air passing through said aperture and transporting it to said associated opening, each said elbow having first and second ends and having seals on each end, said first end seal being seal connected to one side of said cab around a corresponding aperture and adjacent a corresponding air gathering means in said cab elbow being fabricated from soft rubber having good thermal and acoustical damping characteristics;

(e) means for combining the air passing through said pair of openings and channeling said combined airflow to said engine, said combining means being substantially located within said hood compartment, wherein each of said second end seals of said pair of cab elbows is seal connected to said firewall around a corresponding one of said openings; and (f) means mounted to and forming part of said truck for filtering all air that passes through said cab, before the combined airflow enters said engine.

6. An apparatus according to claim 5 wherein each of said cab elbows is constructed of rubber.

7. An apparatus according to claim 5 wherein said filtering means forms part of each of a pair of cowls mounted to and outside of said truck.

8. An apparatus according to claim 5 wherein said filtering means includes one air cleaner located within said hood compartment and a second air cleaner forming part of a cowl mounted to and outside said truck.

* * * * *